US008160914B1

(12) United States Patent
Karipides

(10) Patent No.: US 8,160,914 B1
(45) Date of Patent: Apr. 17, 2012

(54) IDENTIFYING QUALITY USER SESSIONS AND DETERMINING PRODUCT DEMAND WITH HIGH RESOLUTION CAPABILITIES

(75) Inventor: Daniel Paul Karipides, Round Rock, TX (US)

(73) Assignee: Versata Development Group, Inc., Austin, TX (US)

( * ) Notice: Subject to any disclaimer, the term of this patent is extended or adjusted under 35 U.S.C. 154(b) by 1408 days.

(21) Appl. No.: 10/699,148

(22) Filed: Oct. 31, 2003

(51) Int. Cl.
F06F 17/60 (2006.01)
(52) U.S. Cl. .................................. 705/7.29
(58) Field of Classification Search .............. 705/10, 705/7.29
See application file for complete search history.

(56) References Cited

U.S. PATENT DOCUMENTS

| | | | | |
|---|---|---|---|---|
| 5,754,939 A * | 5/1998 | Herz et al. | ............ | 455/3.04 |
| 5,765,143 A | 6/1998 | Sheldon et al. | ............ | 705/28 |
| 5,966,695 A * | 10/1999 | Melchione et al. | ............ | 705/10 |
| 6,266,668 B1 * | 7/2001 | Vanderveldt et al. | ............ | 707/10 |
| 6,470,324 B1 | 10/2002 | Brown et al. | ............ | 705/28 |
| 6,711,550 B1 | 3/2004 | Lewis et al. | ............ | 705/10 |

* cited by examiner

Primary Examiner — Romain Jeanty
(74) Attorney, Agent, or Firm — Hamilton & Terrile, LLP; Kent B. Chambers

(57) ABSTRACT

A session quality system collects and evaluates data from multiple user world wide web ("web") product selection sessions and correlates the collected data with actual product purchases. The system assembles the data into a set of session profiles and assigns a score to each profile that represents a relative likelihood of purchasing the product. The system matches session data collected from future product selection sessions with a master profile. A weighted average of scores based on matched master profiles provides useful product demand information. Furthermore, the system can determine product demand with varying ranges of resolution. For example, the system can capture specific features of each product, such as color, audio system selections, and wheel types. Since these features can be common across multiple products, manufactures can expand their use of the high resolution product demand information.

44 Claims, 9 Drawing Sheets

IDENTIFYING QUALITY USER SESSIONS AND DETERMINING PRODUCT DEMAND WITH HIGH RESOLUTION CAPABILITIES

BACKGROUND OF THE INVENTION

1. Field of the Invention

The present invention relates in general to the field of information processing, and more specifically to a system and method for using data from user sessions to determine product demand. The system and method also has the capability to determine demand of product features with high-resolution.

2. Description of the Related Art

Manufacturers often attempt to determine demand for certain products. In many industries, such as the automotive industry, a significant time delay exists between when a product should be specified for manufacture and when the product is available for sale. Manufacturers risk a significant amount of revenue based on forecasted demand. For example, consider a truck manufacturer who builds 25% of the trucks with 4×4 drive trains and 75% with 4×2 drive trains based on an inaccurate forecast. The manufacturer and dealers typically lose a significant amount of money if the actual demand for 4×4 versus 4×2 trucks is more than a few percentage points different than forecasted. Even if the profit margins on 4×4 and 4×2 trucks are the same, a dealer may be forced to discount a 4×4 truck to a buyer who preferred a 4×2 truck and vice versa. Therefore, manufacturers who base manufactured products on forecasted demand place a high value in accurate product demand forecasts.

Unfortunately, consistently forecasting accurate demand remains an elusive goal. In the above example, the truck manufacturer divided truck production between 4×2 trucks and 4×4 trucks. In reality, the set of products is often very large, where each particular factory configuration of a product is considered a separate product. For example, not only do manufacturers forecast drive trains, they also forecast a large number of other configuration alternatives such as exterior and interior colors, engine sizes, body styles, seat numbers, option packages, and wheel type. The increasing number of configuration options renders consistently accurate forecasting difficult.

In almost all circumstances, manufactures use actual dealer sales data to forecast demand. However, historically such data is often not a good predictor of future buying trends. The primary reason for such inaccuracy is often referred to as the "white car problem". If a buyer prefers a car and the dealer only has a white car but no red car, the buyer may purchase the white car. However, often the dealer enticed the buyer with incentives such as vehicle discounts, extra options at no additional charge, and/or a higher trade-in allowance. Thus, the actual sales data did not accurately represent buyer demand and will likely misrepresent forecasted demand as well.

SUMMARY OF THE INVENTION

In one embodiment of the present invention, data is collected from user sessions to develop master profile sets. User sessions are generally conducted via a network, such as a user session with a product site on the world wide web. The collected data represents values of various data types. In general, larger sets of data types provide higher resolution product demand information. The user sessions used to develop the master profile sets represent users who have a known propensity to purchase a product. User sessions associated with a lead generation or an actual product purchase generally have a known propensity to purchase. The propensity to purchase a product represents a good proxy for determining whether the user session is a quality session, i.e. a session that can be used to determine product demand information. An indicator of product demand is associated with each master session profile. The indicator can be a score that represents the likelihood that a user having a user session matching a master session profile will have substantially the same probability of purchasing a product as the user from which the master session profile was generated. Thus, data collected from other user sessions is scored by matching to a master session profile to determine the likelihood of the user purchasing the product selected by the user during the user's session. Demand for various products offered through the product site can be generated using the aggregate scores of user sessions.

In another embodiment of the present invention, a method of determining product demand using a data processing system and collected network session data from at least one product selection network site, includes developing a set of master session profiles, wherein the master session profiles include product demand indicators. The method further includes processing at least a subset of user session data to evaluate the user session data using the master session profiles and determining product demand from the evaluations. The product demand can be determined from the evaluations in accordance with:

$$PD_j = \frac{\sum_{i=0}^{n} k_{ji}}{\sum_{i=0}^{m} k_i} \times 100\% \quad j \in N$$

where:
  j represents a specific product,
  $PD_j$ represents the product demand information for product j,
  n=total number of user sessions selecting product j,
  k=user session scores,
  $k_j$=user session scores for product j; and
  m=total number of user sessions for all products.
  N=total number of products.

In another embodiment of the present invention, a method of determining product demand using a data processing system and collected network session data from at least one product selection network site includes processing at least a subset of collected user session data to evaluate characteristics of the user session data against product demand characteristics derived from a set of master session profiles. The master session profiles include product demand indicators. The method further includes determining product demand from the evaluations.

In another embodiment of the present invention, a method of determining product demand using an electronic data processing system includes collecting data from multiple user sessions with a world wide web ("Web") site. The user sessions involve selecting a product marketed by the Web site and the collected data includes user navigation data related to selection of a product selection and Web page data as provided to the user. The method also includes developing a product demand master profile set from the collected data and collecting a second set of user session data. The method further includes matching the second set of user session with the master profile set to determine product demand.

In another embodiment of the present invention, a system for determining product demand using a data processing system and collected network session data from at least one product selection network site includes a master session profile generation system to develop a set of master session profiles. The master session profiles include product demand indicators. The system also includes a processing engine to process at least a subset of user session data to evaluate the user session data using the master session profiles and determine product demand from the evaluations.

In another embodiment of the present invention, a computer program product includes instructions encoded thereon to determine product demand using a data processing system and collected network session data from at least one product selection network site. The instructions are executable by a processor to develop a set of master session profiles, wherein the master session profiles include product demand indicators, process at least a subset of user session data to evaluate the user session data using the master session profiles, and determine product demand from the evaluations.

In another embodiment of the present invention, a system to determine product demand using a data processing system and collected network session data from at least one product selection network site, the system includes means for developing a set of master session profiles, wherein the master session profiles include product demand indicators. The system also includes means for processing at least a subset of user session data to evaluate the user session data using the master session profiles and means for determining product demand from the evaluations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
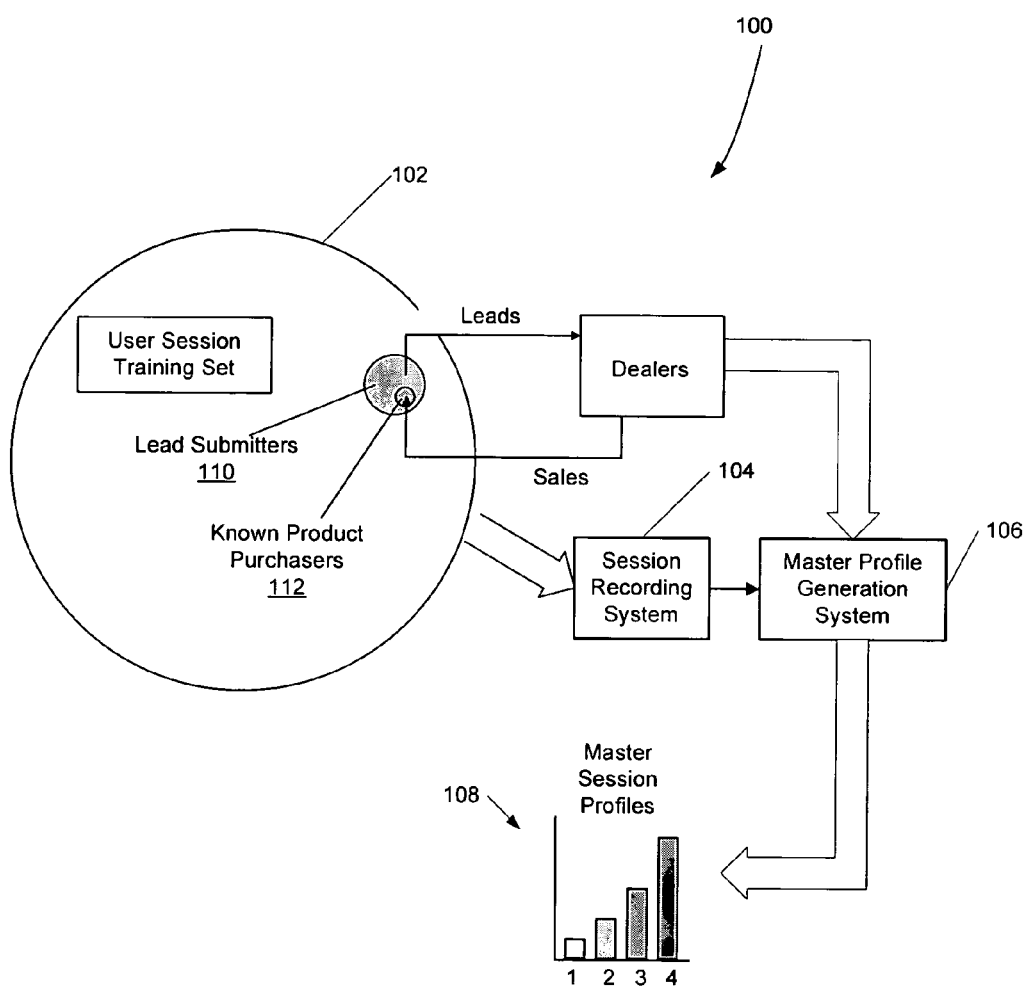
FIG. 1 depicts a product demand resolution system.

In one embodiment of the present invention, a session quality system collects and evaluates data from multiple user world wide web ("web") product selection sessions and correlates the collected data with actual product purchases. The system assembles the data into a set of master session profiles and assigns a score to each profile that represents a relative likelihood of purchasing the product. After developing the master session profiles, the system matches session data collected from new product selection sessions against the one or more master session profiles. The system then assigns scores to the new product selection sessions. Weighting the products selected during the new product selection sessions using the assigned scores provides an indication of product demand. Empirical results establish a close correlation between predicted product demand and actual product demand. The demand data provides useful product demand information because generally a useful amount of time elapses between when web session and actual product purchase. The elapsed time is useful in that it provides enough lead time to manufacture a product in accordance with determined product demand. Thus, evaluating the selections of users using the predetermined profiles and determining the likelihood of the user actually purchasing the product can provide useful product configuration demand information. Using the scores of the matching profiles, a weighted average of the users product selections provides useful product demand information. Furthermore, the system is capable of determining product demand with a high degree of resolution. For example, the system can capture specific features of each product, such as color, audio system selections, and wheel types. Since these features can be common across multiple products, manufactures can expand their use of the high resolution product demand information.

As depicted with empirical data in FIGS. 7 and 8 (described in more detail below), some network users, such as world wide web users, provide more reliable product demand data than others. For example, some users utilize a web site to configure products that they have little if any actual intention of purchasing. Other users represent true prospective customers, and their product choice represents a product that they actually intend to purchase. Thus, the product selected by true prospective purchasers is more likely to be purchased than the product selected by the non-serious user.

A challenge arises to determine how to measure the product demand authenticity of each user session. Product demand authenticity reflects the amount of value to be placed on a user session regarding the user session's reliability as an accurate indication of product demand. A "propensity to purchase" represents one measure of product demand authenticity. The more likely a user is to purchase a vehicle, the more reliable the product selected by the user is when developing product demand information.

Referring to FIG. 1, deriving a degree of product demand authenticity from a user session presents another challenge. One embodiment of a product demand resolution system, product demand resolution system 100, uses a selection of collected data to initially calibrate a product demand master profile set from a selected set of user session data referred to as a training set 102. The training set 102 includes collected user session data during user sessions with a web site used for marketing a product. For example, the web site could be a vehicle marketing site, a computer marketing site, or other product marketing site. The training set 102 represents a predetermined number of user sessions that represent a statistically complete sample. The session recording system 104 records the user session data. User session data refers to data generated during a user session. The Web system 400 described in Karipides et al. U.S. patent application Ser. No. 10/324,764, filed Dec. 20, 2002, entitled "Generating Contextual User Network Session History in a Dynamic Content Environment" (referred to herein as Karipides et al.) represents one embodiment of session recording system 104. Karipides et al. is incorporated herein by reference in its entirety. Table 1 contains an example listing of data types used to profile selected user session data of the training set 102. The data types represent one embodiment of indicators used by product demand resolution system 100 to develop product demand information.

TABLE 1

User Data Types

Session Duration
Duration In Configuration Specific Tasks
Number of Page Views
Number of Configuration Clicks (i.e. the number of parts selected by the user.)
Number of Vehicle Compares
Number of Trim Compares
Number of Vehicles Configured
Number of Trims Configured
Number of Locates (i.e. the number of user searches of dealer inventory.)
Session Referrer (i.e. the identification of any referral web site such as an OEM web site or a web site with related content.)
Number of Notables (Notables are specific questions to the users when they pick incompatible features)
Number of Notables Acceptances
Number of Notable Rejections The master profile generation system 106 develops a set of master session profiles 108. Each profile in the set of master session profiles 108 represents data collected from one user session in training set 102. The collected data represents the values of the data types associated with each master session profile. In one embodiment, only the user session data from lead submitters 110 and known product purchasers 112 is selected for use to generate master session profiles 108. The intentions of lead submitters 110 and known product purchasers 112 can generally be determined with a much higher degree of certainty than the intentions of the remainder of the user session training set 102. For each user session profile, master profile generation system 106 determines a distinct probability of whether the user will actually purchase a product. In one embodiment, the master profile generation system 106 generates the master session profiles 108 using user sessions from which the propensity to purchase a product can be determined. The propensity to purchase a product has been determined to be a good gauge of the quality of the user session data, i.e. the degree of usefulness of the user session data in determining product demand. Lead submitters 110 have a higher likelihood of purchasing a product than users who do not submit a lead. Known product purchasers 112, of course, have a 100% probability of purchasing a product. Although only a small percentage of users actually submit a lead or are known, actual purchasers, the profiles generated from lead submitters 110 and known product purchasers 112 represent a significant percentage of actual product purchases.

As described in more detail below, the master profile generation system 106 assigns a score to each master session profile. The scores correlate with the relative probability of a user purchasing a product. Table 2 represents an example score distribution for master session profiles 108. Thus, the user associated with session profile 1 is 4.8, i.e. 0.048/0.010, times more likely to purchase a product than the user associated with session 4, the user associated with session profile 2 is twice, i.e. 0.028/0.014, as likely to purchase a product than the user associated with session 3, and so on. The number of independent master session profiles 108 will generally depend upon, for example, the number of unique data types used to define each master session profile.

TABLE 2

| Master Session Profiles | Score |
|---|---|
| 1 | 4.8% |
| 2 | 2.8% |
| 3 | 1.4% |
| 4 | 1.0% |

Figure 2:
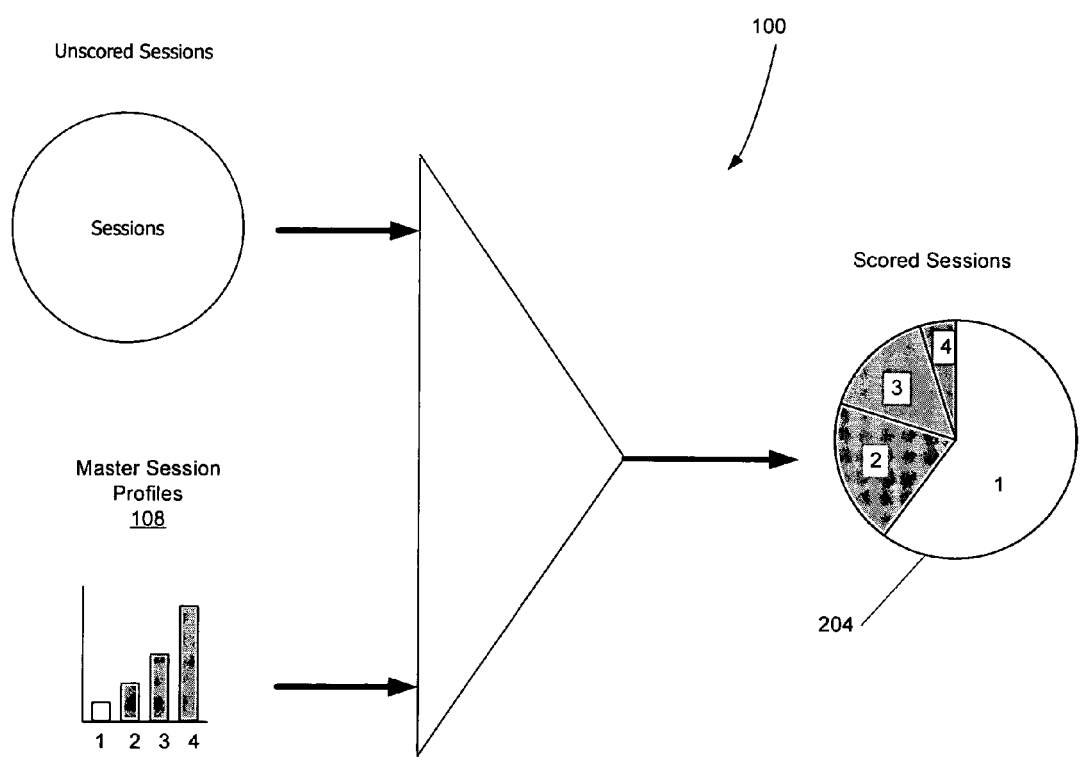
FIG. 2 depicts a process of correlating unscored users session data with master session profiles.

Referring to FIG. 2, once the master session profiles 108 are developed, the product demand resolution system 100 matches new, unscored user sessions 202 with the master session profiles 108 to score the new sessions. The recording system 104 records user session data 202. In one embodiment, the recorded user session data 202 includes the same data types used to generate the master session profiles 108. The product demand resolution system 100 correlates the master session profiles 108 with each new user session to develop the scored user sessions 204. For example, if a user session matches master session profile 1, the user session is assigned a score equal to the score of master session profile 1. If a user session matches master session profile 2, the user session is assigned a score equal to the score of master session profile 2, and so on.

In general, most user sessions will not represent a high propensity to purchase a product. The pie graph of scored user sessions 204 illustrates an example distribution of user sessions. However, since the scores represent the probability of a user actually purchasing a vehicle, user sessions having a higher probability to purchase a product play a more significant role in determining product demand. Thus, although the number of the user sessions correlating with a high probability of product purchase may be low, the significance of these sessions is high. As discussed below, the significance is sufficient to empirically yield consistently accurate product demand information.

Figure 3:
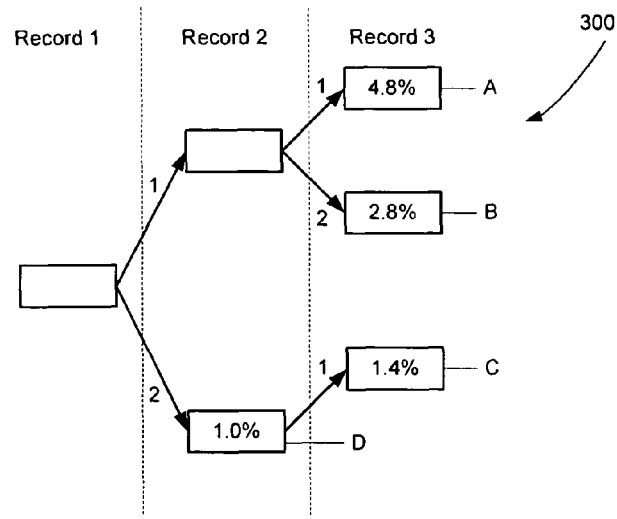
FIG. 3 depicts one embodiment of a master session profile-to-new user session matching process.

FIG. 3 depicts one embodiment of a master session profile-to-new user session matching process 300. Matching process 300 represents a decision tree with each node representing a value or range of values of a particular data type as recorded by session recording system 104. In one embodiment, as a user session progresses, matching process 300 progresses through the decision tree from left-to-right. User sessions can be stored and processed by session matching process 300 in batches. The path traversed as dictated by the collected user session data eventually ends at the leaf nodes A, B, C, and D. At the leaf nodes, matching process 300 assigns a score to the user session path. In one embodiment, the decision tree is designed to provide a one-to-one correspondence between each user session and a path in the decision tree. The decision tree can be designed using Microsoft Analysis Services by Microsoft Corp. of Redmond, Wash. Microsoft Analysis Software is available as an optional component of the Microsoft SQL Server 2000, which is also available from Microsoft Corp. of Redmond, Wash. Further illustrative information on designing the decision tree can be found in *Data Mining With Microsoft SQL Server* 2000, by Claude Seidman, Microsoft Press A Division of Microsoft Corporation, One Microsoft Way, Redmond, Wash. 98052-6339, 2001, ISBN: 0-7356-1271-4. Pages 97-113 of *Data Mining With Microsoft SQL Server* 2000 are particularly relevant. "Data Mining With Microsoft SQL Server 2000" is incorporated herein by reference in its entirety. In one embodiment, the decision tree is designed by determining the possible navigational paths (or at least the navigational paths of interest) through a web site and using the Microsoft Analysis Software to determine the nodes of the decision tree.

Although a decision tree implements the matching process 300 depicted in FIG. 3, other matching processes can be used. For example, vector and matrix quantization techniques can be used. Additionally, interpolation and extrapolation techniques could also be used if one-to-one matching is not used. The decision tree can be updated periodically and/or as new user session becomes available.

Once the decision tree of matching process 300 is implemented, the master profile generation system 106 assigns scores to each leaf node of the decision tree. The scores are assigned based upon empirical data of actual product purchasers. For example, master profile generation system 106 preferably analyzes a statistically relevant number of user sessions, which may, for example, be one million or more. For example, four possible user session navigation paths A, B, C, and D may exist, and master profile generation system 106 assigns a score is assigned to each path. The score is depicted in each leaf node for convenient reference. The assigned score for each particular path equals the percentage of users that followed the particular path and purchased a product. Thus, 4.8% of the master session profiles that followed path A of the decision tree of matching process 300 actually purchased a product, 2.8% of the master session profiles that followed path B of the decision tree of matching process 300 actually purchased a product, and so on.

Figure 4:
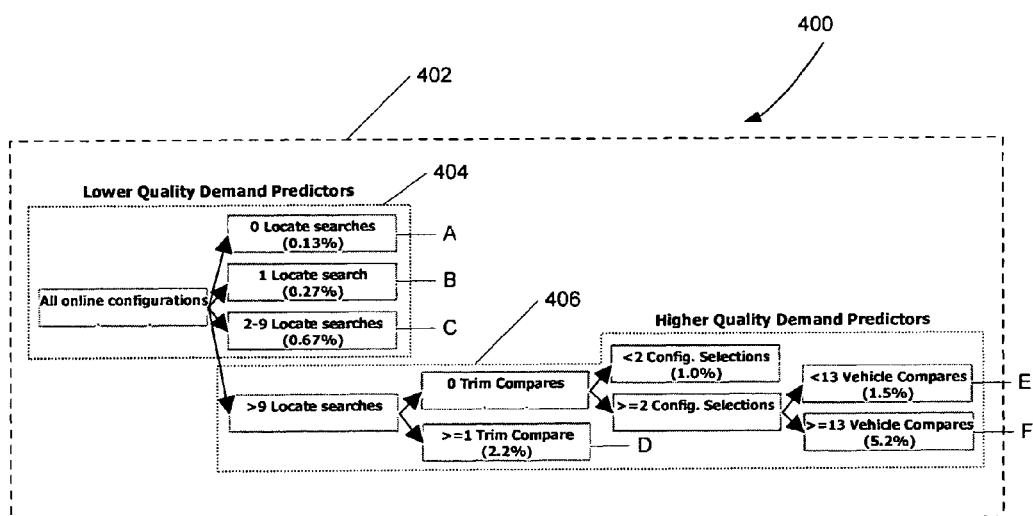
FIG. 4 depicts one embodiment of the matching process depicted in FIG. 3.

FIG. 4 depicts matching process 400, which is one embodiment of matching process 300. Decision tree 402 depicts a representative portion of matching process 300. Matching process 400 matches a user session with an automotive web site to master session profiles previously generated from user sessions to the site. Matching process 400 ultimately yields a score for a user session that can be used to determine actual product demand.

The path of decision tree 402 that correlates to a particular user session depends upon the values of recorded data. In decision tree 402, the number of locate searches, trim compares, the number of configuration selections, and the number of vehicle compares represent types of recorded data used to assign a score to the user session. The score can then be used in conjunction with scores from other correlated user sessions to develop product demand information.

Using the example scores from matching process 402, during a vehicle configuration session a user may or may not conduct a "locate search", i.e. search for a location of a configured vehicle, compare vehicle trim packages, make different configuration selections, and compare a configured vehicle to other vehicles. Table 3 depicts the scores assigned to a user session based upon the path followed in matching process 400. Paths A, B, and C in block 404 represent low quality demand predictors, and paths D, E, and F in block 406 represent high quality demand predictors.

TABLE 3

| Path | Score |
|------|-------|
| A | 0.13% |
| B | 0.27% |
| C | 0.67% |
| D | 2.2% |
| E | 1.5% |
| F | 5.2% |

A user following path F is 40 times (i.e. 5.2/0.13) more likely to purchase a vehicle than a user following path A, a user following path F is 3.47 times more likely to purchase a vehicle than a user following path E, and so on.

Figure 5:
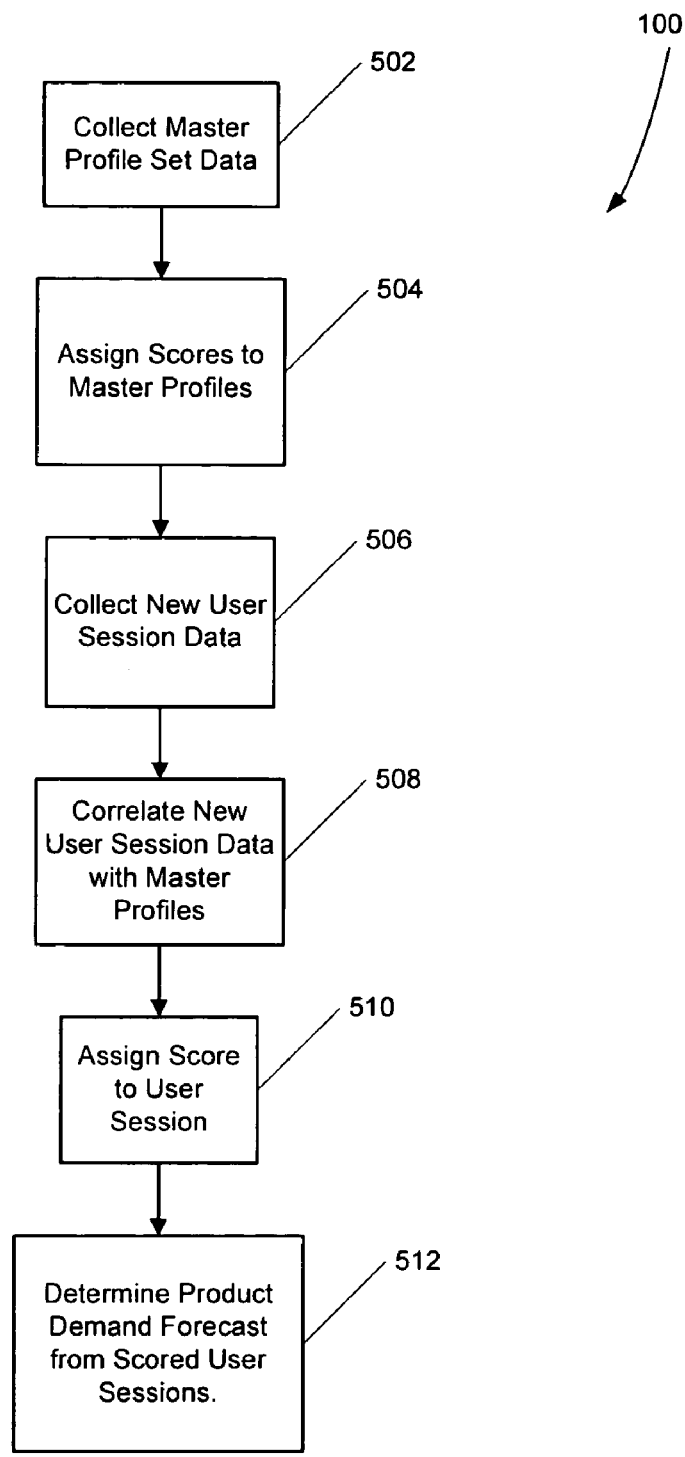
FIG. 5 depicts the product demand resolution system 100 process of developing product demand information.

FIG. 5 depicts the product demand resolution system 100 process of developing product demand information. As discussed in more detail above, the first operations in developing product demand information involve collecting master profile data 502, assigning scores to master profiles 504, collecting new user session data 506, correlating new user session data with master profiles, and assigning a score to each user session 510. Once scores are assigned to user sessions, in operation 512, product demand resolution system 100 can determine product demand information.

Equation [1] sets forth one embodiment of an algorithm used by product demand resolution system 100 to determine product demand for products available on a web site. Referring to Equation [1], if the web site has N products available, Equation [1] is used to determine the product demand of each product relative to all the products. In other words, Equation [1] determines the appropriate mix of products. For example, if Product j is one of the N products, i.e. j is an element of the set of N products ("j∈N"), then the product demand for Product j as a percentage of the demand for all Products 1 through N, equals the sum of all user session scores associated with user sessions that finally selected Product j divided by the sum of all user session scores associated with all N products.

$$PD_j = \frac{\sum_{i=0}^{n} k_{ji}}{\sum_{i=0}^{m} k_i} \times 100\% \quad j \in N \qquad \text{Equation [1]}$$

where:
  j represents a specific product,
  $PD_j$ represents the product demand information for product j,
  n=total number of user sessions selecting product j,
  k=user session scores,
  $k_j$=user session scores for product j; and
  m=total number of user sessions for all products.

Equation [1] represents only one embodiment of determining product demand information. It will be apparent to others of ordinary skill in the art that the user session scores can be manipulated in any number of ways to determine product demand with high resolution capabilities. For example, different weighting factors could be included in Equation [1] based upon predicted variances in the determined product demand due to other factors such as a recent advertising campaign or incentives offered for a specific product or products.

Table 4 sets forth data for an example determination of product demand information. In this example, the total number of products, N, equals 3. The total number of user sessions selecting a particular product j is n, where n may be different for each product j.

TABLE 4

| j | $k_{j1}$ | $k_{j2}$ | ... | $k_{jn}$ | $\sum_{i=0}^{n} k_{ji}$ | $PD_j$ |
|---|------|------|-----|------|---------|--------|
| 1 | .13% | 1.0% | ... | 5.2% | 1,200% | 16.7% |
| 2 | .67% | 1.5% | ... | 1.0% | 2,400% | 33.3% |
| 3 | 2.2% | .35% | ... | 2.2% | 3,600% | 50% |

As depicted in Table 4, the product demand resolution system 100 determines that the product demand of product is 16.7% of all products should be Product 1, 33.3% of all products should be Product 2, and 50% of all products should be Product 3. The number of products used in this example is kept small for conciseness, but it will be clear to persons of ordinary skill in the art that product demand resolution system 100 can be used for any number of products.

Figure 6:
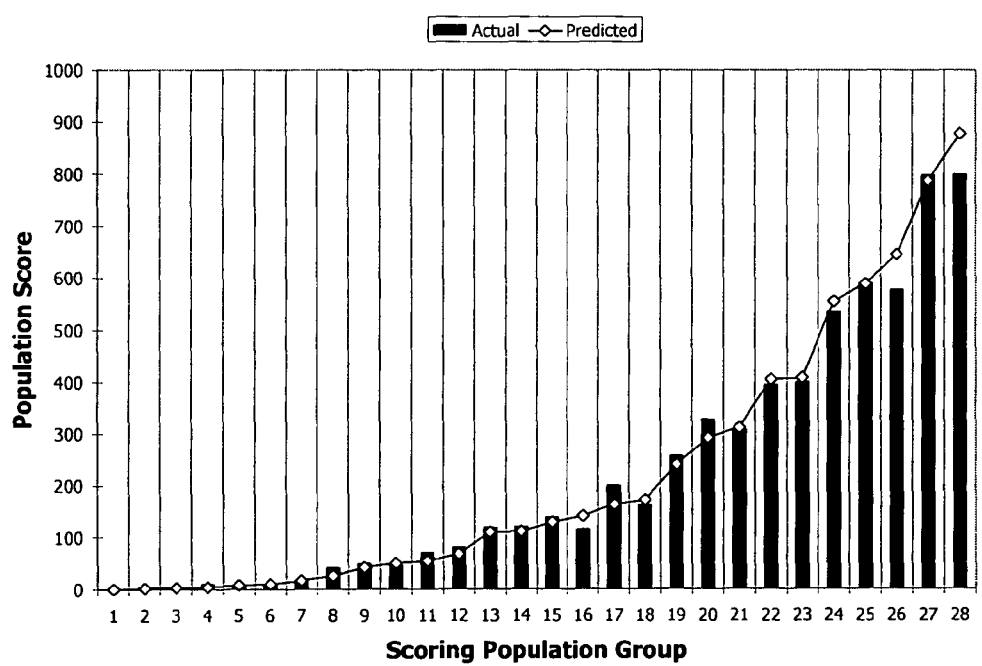
FIG. 6 depicts actual demand versus predetermined product demand results using the product demand resolution system of FIG. 1.

FIG. 6 depicts actual demand versus determined product demand using the product demand resolution system 100 for an automotive web site. The scoring population group represents users grouped by common paths in a decision tree. The population scores represent the normalized aggregate scores assigned to each group. The correlation between actual demand and determined product demand is very close, thus, validating the usefulness of product demand resolution system 100.

Figure 7:
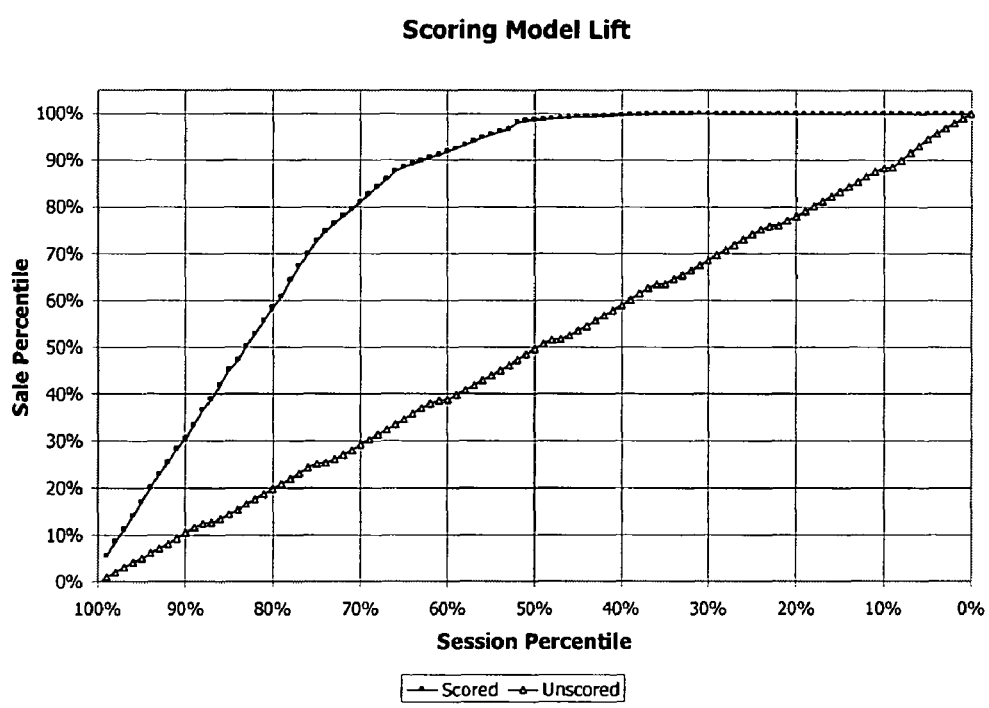
FIG. 7 depicts a comparison of scored user sessions using product demand resolution system 100 and unscored user sessions.
Figure 8:
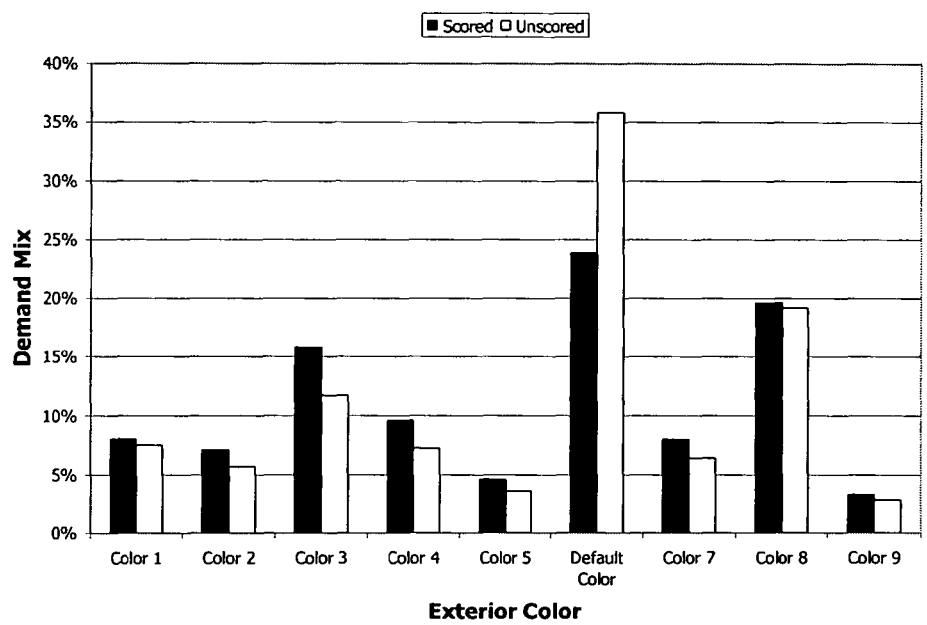
FIG. 8 depicts demand for exterior colors using scoring by product demand resolution system of FIG. 1.

FIG. 7 depicts a comparison of scored user sessions using product demand resolution system 100 and unscored user sessions. Unscored user sessions assume that all users are equally likely to actually purchase a selected product. The scored user sessions have scores assigned by product demand resolution system 100. As depicted in FIG. 7, product demand resolution system 100 predicts that most sales will be associated with users having a high user session score. In fact, users having user session scores in the top 10% account for 30% of all product purchases, users having user session scores in the top 50% account for virtually 100% of all product purchases. Thus, product demand resolution system 100 can provide superior results compared to systems using unscored sessions.

In one embodiment, the product demand data for each product can be used to determine demand for particular product features as well as overall product demand because the granularity of product description used by product demand resolution system 100 is limited only by the granularity of collected user session data and the ability to collect the data in a meaningful way that lends itself to analysis. Embodiments of Karipides et al. provide a capability to develop high resolution product demand information. For example, several products may have the same exterior color. FIG. 8 depicts product demand for exterior colors using scoring by product demand resolution system 100 (represented by the scored bars) and product demand using unscored user sessions. FIG. 8 also demonstrates a specific effect of using product demand resolution system 100 versus unscored user session data. The difference is most noticeable for the default color because often users who do not have a higher degree of product demand authenticity tend have a higher likelihood of leaving the default color unchanged during the user session.

Additionally, the volume of each product can be derived from scores assigned to user sessions. By comparing different the sums of scores for each product over time, changes in the sum for a product can represent an increased interest in the product. The change can be correlated into an increase demand for the product. In one embodiment, a linear correlation is used, e.g. a 15% increase in the sum of the score for Product j correlates to a 15% increase in product demand volume for Product j. In other embodiments, the correlation is nonlinear and/or weighted to account for other influences in score changes, such as advertising campaigns, new product introduction and corresponding increased curiosity.

Thus, the product demand resolution system 100 effectively determines product demand using objectively recorded user session data. Additionally, the product demand resolution system 100 can exhibit high resolution product demand capabilities.

Figure 9:
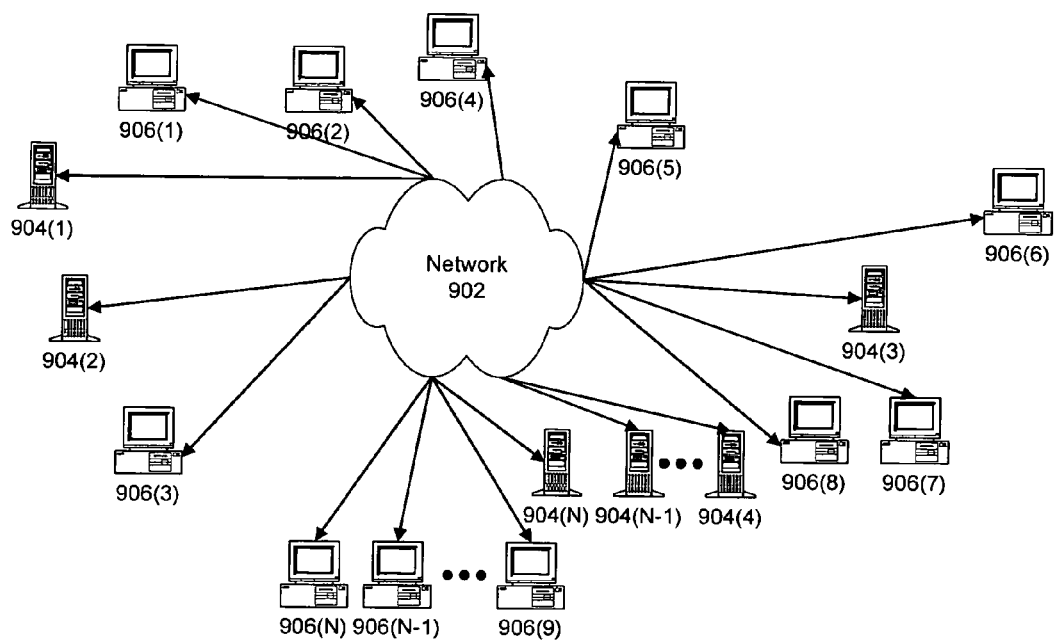
FIG. 9 depicts a network environment in which product demand resolution system of FIG. 1 may be practiced.

FIG. 9 is a block diagram illustrating a network environment in which product demand resolution system 100 may be practiced. Network 902 (e.g. a private wide area network (WAN) or the Internet) includes a number of networked server computer systems 904(1)-(N) that are accessible by client computer systems 906(1)-(N), where N is the number of server computer systems connected to the network. Communication between client computer systems 906(1)-(N) and server computer systems 904(1)-(N) typically occurs over a network, such as a public switched telephone network over asynchronous digital subscriber line (ADSL) telephone lines or high-bandwidth trunks, for example communications channels providing T1 or OC3 service. Client computer systems 906(1)-(N) typically access server computer systems 904(1)-(N) through a service provider such as an Internet service provider by executing application specific software, commonly referred to as a browser, on one of client computer systems 906(1)-(N).

Client computer systems 906(1)-(N) and/or server computer systems 904(1)-(N) may be, for example, computer systems of any appropriate design, including a mainframe, a mini-computer, a personal computer system, or a wireless, mobile computing device. These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, CD-ROM drives and magneto-optical drives may also be provided, either as an integrated or peripheral device. One such example computer system is shown in detail in FIG. 10.

Figure 10:
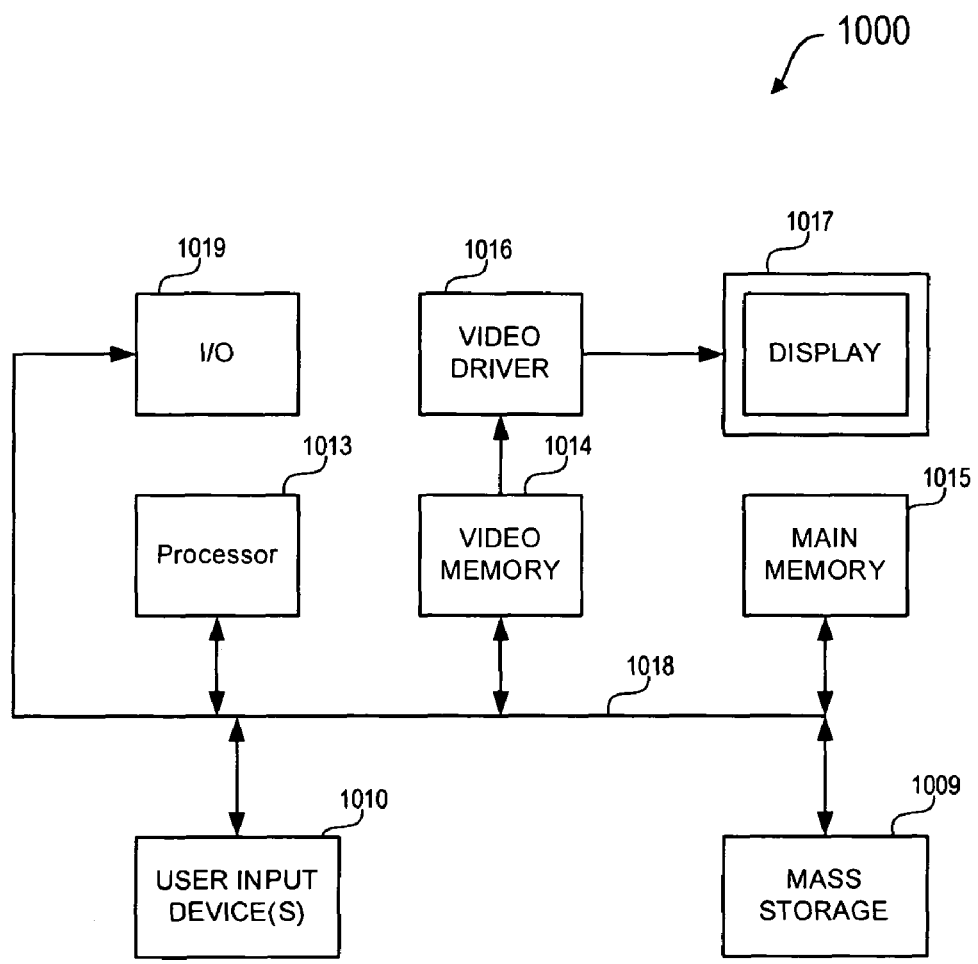
FIG. 10 illustrates a general purpose computer system.

Embodiments of the product demand resolution system 100 can be implemented using software processing engine executable using a processor in a computer system such as a general-purpose computer 1000 illustrated in FIG. 10. Input user device(s) 1010, such as a keyboard and/or mouse, are coupled to a bi-directional system bus 1018. The input user device(s) 1010 are for introducing user input to the computer system and communicating that user input to processor 1013. The computer system of FIG. 10 also includes a video memory 1014, main memory 1015 and mass storage 1009, all coupled to bi-directional system bus 1018 along with input user device(s) 1010 and processor 1013. The mass storage 1009 may include both fixed and removable media, such as other available mass storage technology. Bus 1018 may contain, for example, 32 address lines for addressing video memory 1014 or main memory 1015. The system bus 1018 also includes, for example, an n-bit DATA bus for transferring DATA between and among the components, such as CPU 1009, main memory 1015, video memory 1014 and mass storage 1009, where "n" is, for example, 32 or 64. Alternatively, multiplex DATA/address lines may be used instead of separate DATA and address lines.

I/O device(s) 1019 may provide connections to peripheral devices, such as a printer, and may also provide a direct connection to a remote server computer systems via a telephone link or to the Internet via an internet service provider (ISP). I/O device(s) 1019 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1009 until loaded into main memory 1015 for execution. Computer programs may also be in the form of electronic signals modulated in accordance with the computer program and data communication technology when transferred via a network. The method and functions relating to product demand resolution system 100 may be implemented in a computer program alone or in conjunction other hardware.

The processor 1013, in one embodiment, is a microprocessor manufactured by Motorola or Intel. However, any other suitable single or multiple microprocessors or microcomputers may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the display 1017. Video amplifier 1016 is well known in the art and may be implemented by any suitable means. This circuitry converts pixel DATA stored in video memory 1014 to a raster signal suitable for use by display 1017. Display 1017 is a type of monitor suitable for displaying graphic images.

The computer system described above is for purposes of example only. The product demand resolution system 100 may be implemented in any type of computer system or programming or processing environment. It is contemplated that the product demand resolution system 100 can be run on a stand-alone computer system, such as the one described above. The product demand resolution system 100 might also be run from a server computer systems system that can be accessed by a plurality of client computer systems interconnected over an intranet network. Finally, the product demand resolution system 100 may be run from one or more server computer systems that are accessible to clients over the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method of determining product demand using a data processing system and collected network session data from at least one product selection network site, the method comprising:
performing using a processor of the data processing system:
developing a set of master session profiles from a first set of users to determine product demand by a second set of users, wherein the master session profiles include product demand indicators;
processing at least a subset of user session data from the second set of users to evaluate the user session data using the master session profiles; and
determining product demand from the evaluations of at least the subset of the user session data from the second set of users.

2. The method of claim 1 wherein the product demand includes information regarding the demand of one or more features of a product.

3. The method of claim 1 wherein the product demand indicators include values of data types.

4. The method of claim 1 wherein developing a set of master session profiles comprises:
developing a set of master session profiles from recorded data associated with users who either submitted a product lead or purchased a product.

5. The method of claim 1 wherein developing a set of master session profiles comprises:
collecting network session data from a plurality of user sessions conducted with the network site(s);
matching at least a subset of each set of collected user network session data with one or more factors indicating a product demand authenticity; and
assigning an indicator reflecting the product demand authenticity of each user session of the master session profiles.

6. The method of claim 5 wherein at least one of the factors indicating product demand authenticity is a propensity of the user to actually purchase a product offered by the network site accessed by the user.

7. The method of claim 5 wherein the indicator is a relative scoring reflecting that relates product demand authenticity between user sessions.

8. The method of claim 5 wherein evaluating user session data using the master session profiles comprises:
matching at least a subset of the product demand indicators present in a user session with product demand indicators in the master session profiles.

9. The method of claim 8 further comprising:
assigning an indicator reflecting the product demand authenticity of each user session that is matched with the master session profiles.

10. The method of claim 1 wherein determining product demand from the evaluations comprises:
associating product demand evaluations with specific products;
weighting evaluations in accordance with a product demand authenticity indicator; and
comparing the weighted evaluations of users sessions selecting a particular product against a total set of weighted evaluations of user sessions.

11. The method of claim 1 wherein the user session data includes data types associated with each users navigation of the network site during configuration of a product.

12. The method of claim 1 wherein evaluating user session data using the master session profiles comprises:
processing the user session data in accordance with a decision tree using data from the master session profiles as decision criteria.

13. The method of claim 1 wherein determining product demand from the evaluations comprises determining product demand in accordance with:

$$PD_j = \frac{\sum_{i=0}^{n} k_{ji}}{\sum_{i=0}^{m} k_i} \times 100\% \quad j \in N$$

where:
j represents a specific product,
$PD_j$ represents the product demand information for product j,
n=total number of user sessions selecting product j, k=user session scores,
k$_j$=user session scores for product j; and
m=total number of user sessions for all products,
N=total number of products.

14. A method of determining product demand using a data processing system and collected network session data from at least one product selection network site, the method comprising:
performing using a processor of the data processing system:
processing at least a subset of collected user session data to evaluate characteristics of the user session data against product demand characteristics derived from a set of master session profiles, wherein the master session profiles include product demand indicators and the master session profiles are developed from a first set of users and the collected user session data is from a second set of users; and
determining product demand from the evaluations of at least the subset of the user session data from the second set of users.

15. The method of claim 14 wherein the product demand includes information regarding the demand of one or more features of a product.

16. The method of claim 14 wherein the product demand indicators include values of data types.

17. The method of claim 14 wherein developing a set of master session profiles comprises:
developing a set of master session profiles from recorded data associated with users who either submitted a product lead or purchased a product.

18. The method of claim 14 further comprising: wherein developing a set of master session profiles comprises:
developing the set of master session profiles, wherein developing a set of master session profiles comprises:
collecting network session data from a plurality of user sessions conducted with the network site(s);
matching at least a subset of each set of collected user network session data with one or more factors indicating a product demand authenticity; and
assigning an indicator reflecting the product demand authenticity of each user session of the master session profiles.

19. The method of claim 18 wherein at least one of the factors indicating product demand authenticity is a propensity of the user to actually purchase a product offered by the network site accessed by the user.

20. The method of claim 18 wherein the indicator is a relative scoring reflecting that relates product demand authenticity between user sessions.

21. The method of claim 18 wherein evaluating user session data using the master session profiles comprises:
matching at least a subset of the product demand indicators present in a user session with product demand indicators in the master session profiles.

22. The method of claim 21 further comprising:
assigning an indicator reflecting the product demand authenticity of each user session that is matched with the master session profiles.

23. The method of claim 14 wherein determining product demand from the evaluations comprises:
associating product demand evaluations with specific products;
weighting evaluations in accordance with a product demand authenticity indicator; and
comparing the weighted evaluations of users sessions selecting a particular product against a total set of weighted evaluations of user sessions.

24. The method of claim 14 wherein the user session data includes data types associated with each users navigation of the network site during configuration of a product.

25. The method of claim 14 wherein evaluating user session data using the master session profiles comprises:
processing the user session data in accordance with a decision tree using data from the master session profiles as decision criteria.

26. A method of determining product demand using an electronic data processing system, the method comprising:
performing using a processor of the data processing system:
collecting data from multiple user sessions from a first set of users with a world wide web ("Web") site, wherein the user sessions involve selecting a product marketed by the Web site and the collected data includes user navigation data related to selection of a product and Web page data as provided to each of the users in the first set of users;
developing a product demand master profile set from the collected data;
collecting a second set of user session data from a second set of users; and
matching the second set of user session data with the master profile set to determine product demand.

27. The method of claim 26 wherein matching the second set of user sessions with the master profile set comprises matching values of data types collected from each of the second set of user sessions with a master profile from the master profile set using a decision tree.

28. The method of claim 26 wherein the product demand includes information regarding the demand of one or more features of a product.

29. A system for determining product demand using a data processing system and collected network session data from at least one product selection network site, the system comprising:
master session profile generation system to develop a set of master session profiles from a first set of users to determine product demand by a second set of users, wherein the master session profiles include product demand indicators; and
a processing engine to process at least a subset of user session data from the second set of users to evaluate the user session data using the master session profiles and determine product demand from the evaluations.

30. The system of claim 29 further comprising:
a session recording system to collect network session data from at least one product selection network site.

31. The system of claim 29 wherein the processing engine determines product demand in accordance with:

$$PD_j = \frac{\sum_{i=0}^{n} k_{ji}}{\sum_{i=0}^{m} k_i} \times 100\% \quad j \in N$$

where:
j represents a specific product,
PD$_j$ represents the product demand information for product j, n=total number of user sessions selecting product j,
k=user session scores,
$k_j$=user session scores for product j; and
m=total number of user sessions for all products,
N=total number of products.

32. The system of claim 29 wherein the product demand includes information regarding the demand of one or more features of a product.

33. The system of claim 29 wherein the product demand indicators include values of data types.

34. The system of claim 29 wherein the master session profiles are developed from a set of master session profiles from recorded data associated with users who either submitted a product lead or purchased a product.

35. The system of claim 29 wherein the network session data includes data from a plurality of user sessions conducted with the network site(s) and to determine product demand from the evaluations the processing engine matches at least a subset of each set of collected user network session data with one or more factors indicating a product demand authenticity and assigns an indicator reflecting the product demand authenticity of each user session of the master session profiles.

36. The system of claim 35 wherein at least one of the factors indicating product demand authenticity is a propensity of the user to actually purchase a product offered by the network site accessed by the user.

37. The system of claim 35 wherein the indicator is a relative scoring reflecting that relates product demand authenticity between user sessions.

38. The system of claim 35 wherein to determine product demand from the evaluations the processing engine further matches at least a subset of the product demand indicators present in a user session with product demand indicators in the master session profiles.

39. The system of claim 38 wherein the processing engine assigns an indicator reflecting the product demand authenticity of each user session that is matched with the master session profiles.

40. The system of claim 29 to determine product demand from the evaluations the processing engine associates product demand evaluations with specific products, weights evaluations in accordance with a product demand authenticity indicator, and compares the weighted evaluations of users sessions selecting a particular product against a total set of weighted evaluations of user sessions.

41. The system of claim 29 wherein the user session data includes data types associated with each users navigation of the network site during configuration of a product.

42. The system of claim 29 to evaluate user session data using the master session profiles, the processing engine processes the user session data in accordance with a decision tree using data from the master session profiles as decision criteria.

43. A computer program product comprising instructions encoded thereon to determine product demand using a data processing system and collected network session data from at least one product selection network site, the instructions are executable by a processor to:
  develop a set of master session profiles from a first set of users to determine product demand by a second set of users, wherein the master session profiles include product demand indicators;
  process at least a subset of user session data from the second set of users to evaluate the user session data using the master session profiles; and
  determine product demand from the evaluations.

44. A system to determine product demand using a data processing system and collected network session data from at least one product selection network site, the system comprising:
  means for developing a set of master session profiles from a first set of users to determine product demand by a second set of users, wherein the master session profiles include product demand indicators;
  means for processing at least a subset of user session data from the second set of users to evaluate the user session data using the master session profiles; and
  means for determining product demand from the evaluations of at least the subset of the user session data from the second set of users.

* * * * *